Nov. 17, 1925.
R. L. SMITH
MICROSCOPE
Filed Feb. 14, 1925     3 Sheets-Sheet 1
1,561,751
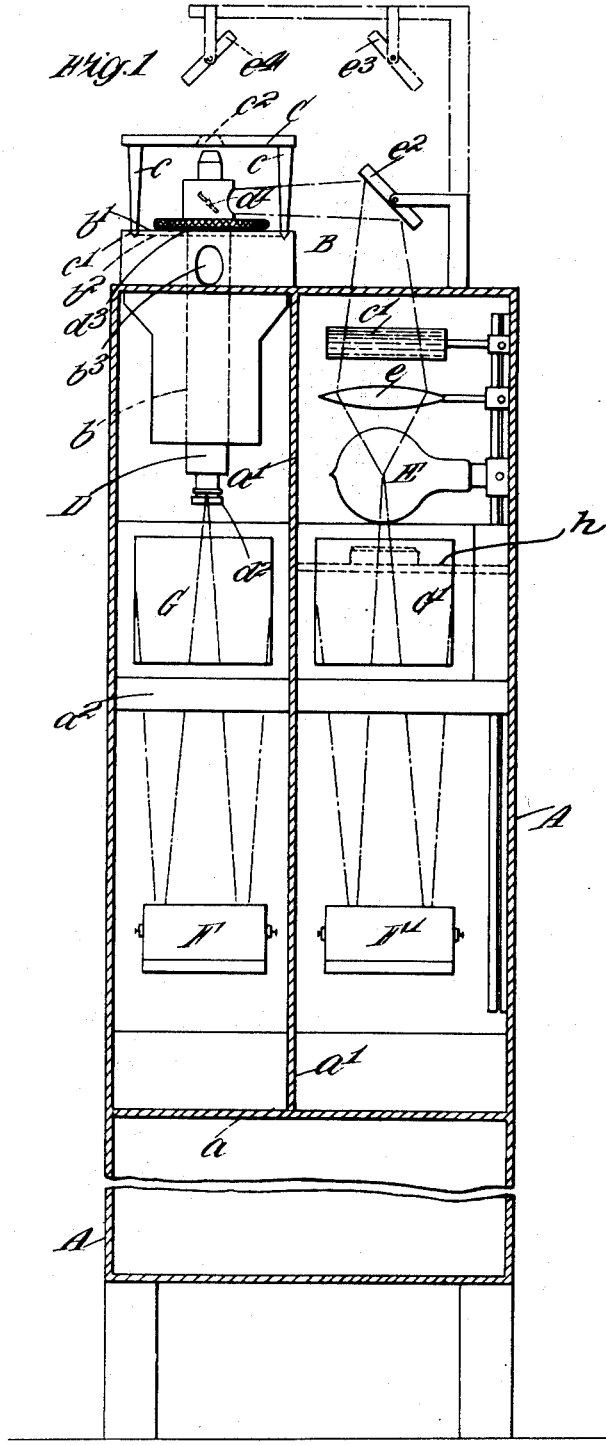

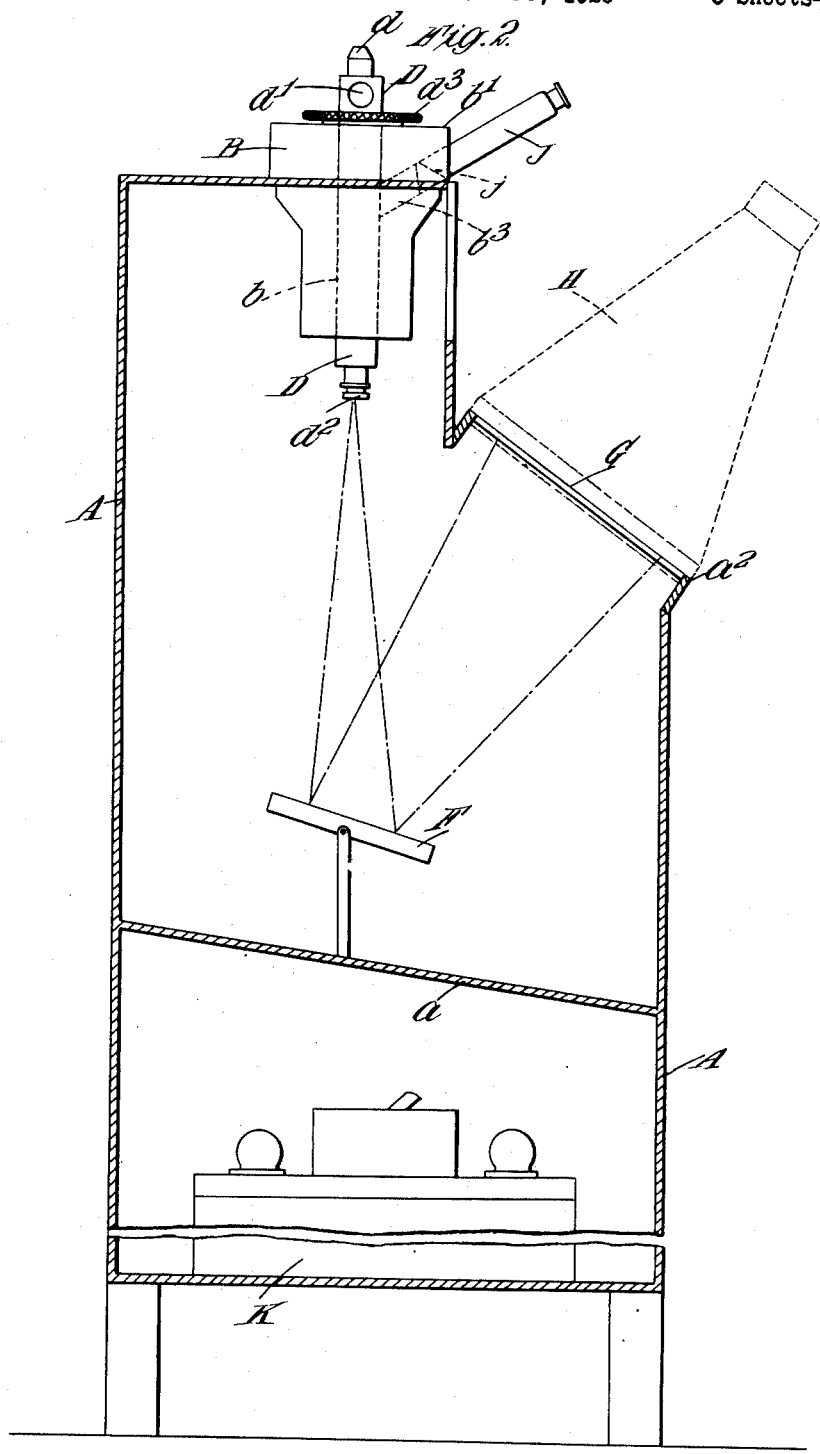

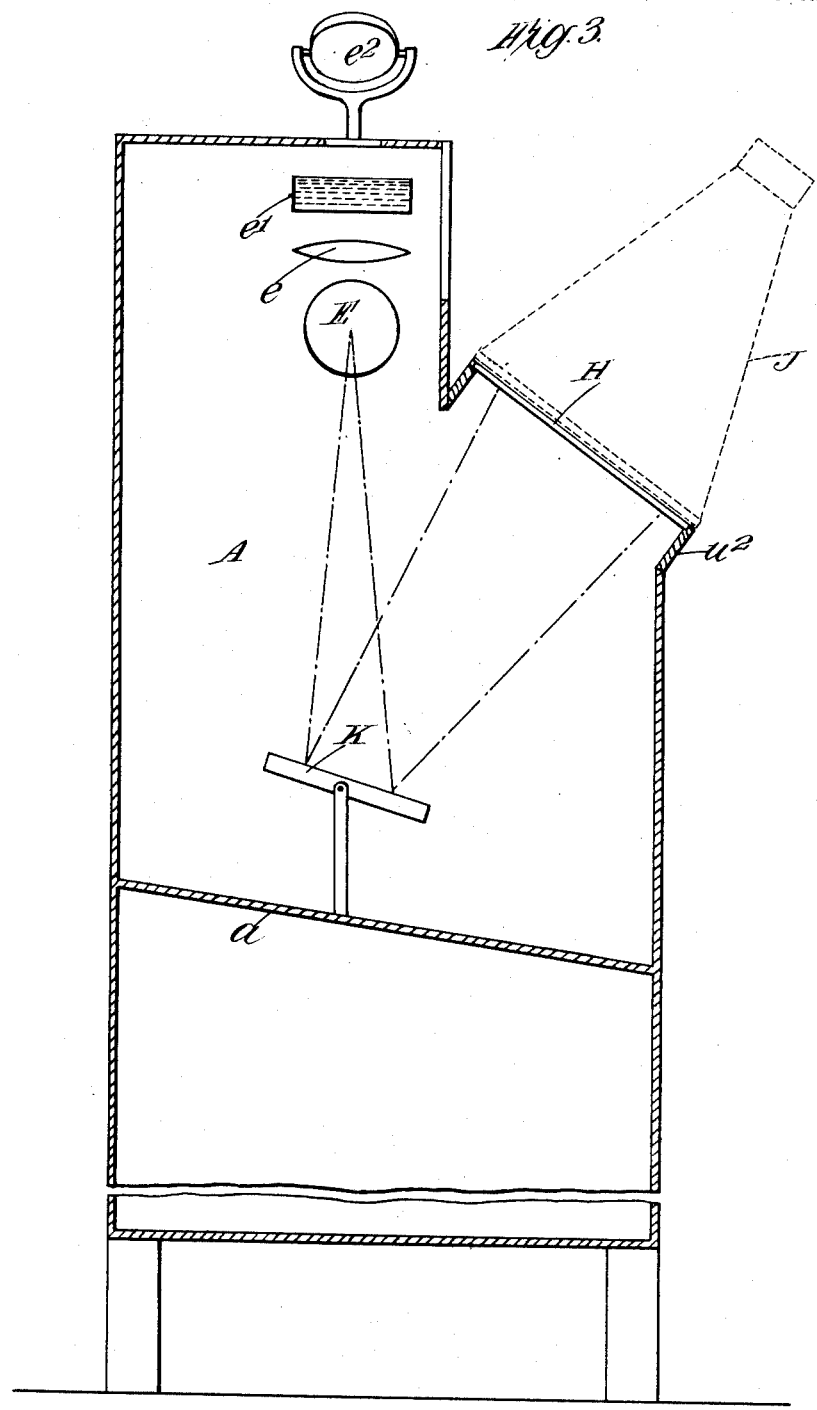

Patented Nov. 17, 1925.

1,561,751

UNITED STATES PATENT OFFICE

ROBERT LOW SMITH, OF WESTMINSTER, LONDON, ENGLAND, ASSIGNOR TO VICKERS LIMITED, OF WESTMINSTER, ENGLAND, A BRITISH COMPANY.

MICROSCOPE.

Application filed February 14, 1925. Serial No. 9,075.

*To all whom it may concern:*

Be it known that I, ROBERT LOW SMITH, a subject of the King of Great Britain, residing at Vickers House, Broadway, Westminster, in the county of London, England, have invented certain new and useful Improvements in or Relating to Microscopes, of which the following is a specification.

This invention relates to the construction of microscopes of the inverted type, in which the object is supported above the object glass and is viewed from below, such microscopes being more especially intended for metallographic work, as only one surface has to be prepared. It is necessary that the surface of the object shall be accurately at right angles to the optical axis and one object of the invention is to obtain such accurate setting without any fitting adjustment and to provide a very robust construction which will not be liable to injury in ordinary use and will rigidly maintain the correct angular setting of the object stage. A further object is to provide a microscope with a comparison device by which the magnified image may be directly compared with a photo-micro plate under similar lighting and other conditions.

In the improved microscope an integral member, usually in the form of a steel block, is made with an axial hole receiving the microscope tube and with an upper surface faced accurately at right angles to the tube hole. A solid block can readily be bored with a tube hole and faced at right angles to the hole axis with the utmost accuracy by suitable lathe or other apparatus and as the face and the hole belong to the same solid block there is no need to make any adjustments in order to obtain the correct angle between the tube axis and the face, as is required in the ordinary construction of microscope. The face of the block may itself serve as the stage on which the object is placed or may carry a separate stage formed as a tripod, having conical feet which rest in a circular V groove cut in the face and allowing the stage to be turned around the optical axis.

For the comparison method a supporting casing adapted to be fitted to or form part of a microscope of camera type is provided with a frame or carrier arranged to receive photo-micro transparencies or comparison plates in a position suitable for convenient view by an observer in association with a screen receiving the microscopically enlarged image to be compared. Illuminating means and means for controlling the illumination of the transparency are provided so that the illumination of the photo-micrograph may be adjusted to that of the microscope image.

In order that the said invention may be clearly understood and readily carried into effect, the same will now be described more fully with reference to the accompanying drawings, in which:—

Figure 1 is an elevation with the casing in section of a construction of microscope embodying this invention, and Figures 2 and 3 are similar views taken at right angles to Figure 1 through the microscope portion and through the comparison device respectively.

A is the casing of sheet metal with angle iron frame, divided into upper and lower compartments by the sloping partition $a$, the upper compartment being sub-divided into two vertical chambers by the vertical partition $a'$. B is the steel block bored with the axial hole $b$ and having its upper face $b'$ made accurately at right angles to the axis of the hole $b$. C is a tripod stage for the object to be examined, the legs $c$ of which have conical feet $c'$ resting in a circular V groove $b^2$ in the face $b'$ of the block B to provide for rotation of the object. D is the microscope tube with object glass $d$ at its upper end immediately below the tripod stage and a reflector or cover glass illuminator $d'$ to illuminate the object from below. At the lower end is the projection ocular $d^2$. The tube D, as already mentioned, is of heavy section and forms a sliding fit in the axial hole $b$ of the block. Focussing adjustment is obtained by means of the adjusting nut $d^3$ on the upper face $b'$ of the block, the nut having a narrow annular face resting on the block face and screwing on a fine thread on the projecting part of the tube D. By turning the ring or nut $d^3$, which has a knurled edge, the position of the object glass is accurately adjusted and the weight of the tube keeps it in position in the hole. This device is employed when a separate stage C is placed upon the block face, but if the latter is itself to serve as the stage the tube adjustment is provided below the face.

The separate stage C consists preferably of a heavy circular steel plate with a central hole $c^2$, into which plate are fixed the three legs $c$ of the tripod and as the stage has no focussing adjustments it can be made very robust to take the weight of heavy objects without injury or distortion. The height of the stage may be arranged according to the magnification, a stage with longer legs being used for low magnification so that the fine adjustments at the tube need not extend through a large range.

The object is illuminated by means of the lamp E placed in the side chamber formed by the vertical partition $a'$, the lamp being condensed into a vertical beam, by the condenser $e$, which then passes through a cooling water trough $e'$ to the mirror $e^2$, from which the beam of light is reflected horizontally to the reflector or cover glass illuminator $d'$ in the microscope tube D.

The reflected light from the object passes through the projection ocular $d^2$ and, if the magnified object is to be viewed upon a ground glass screen, the light is directed on to an optically prepared rustless steel reflector F and projected from this at a suitable angle on to the screen G. This is set in the sloping part $a^2$ of the casing A at a convenient angle for viewing at the front of the instrument.

The comparison camera is placed side by side with the projection microscope above described and is illuminated by the same lamp E as the microscope. The comparison camera carries a photo-micro transparency H forming a screen placed at the side of the projection screen G and in the same plane. The rays from below the lamp E are utilized for illuminating the transparency H, the projection screen and the comparison plate being placed in the same sloping portion $a^2$ of the casing A and covered preferably by the removable hood J indicated in dotted lines, which hood enables both images to be observed without disturbances by extraneous light. The light from the lamp E is diffused or reflected upwards by the tilted reflector K directing the light on to the undersurface of the plate H. To obtain the proper degree of illumination of the plate H so that the photo-micro transparency may have the same illumination as the projected image on the screen G a suitable diaphragm and light filter $h$ is placed below the lamp E or interposed at any suitable position in the beam of light. The complete construction therefore allows any object to be examined and compared with the standard image by observing both together under substantially similar conditions of illumination, the projected image on the screen G giving a representation to any required degree of enlargement of the object under conditions which make the image as similar as possible to the standard transparency H, thus enabling any differences in character between the standard and the projected image to be readily observed.

Direct visual examination may be provided for by an eyepiece tube J sliding through an aperture in the side of the steel block formed at a convenient angle for the observer, an optically prepared mirror $j$ at the inner end of the tube deflecting the light to the eyepiece at the outer end when the tube J is slidden in. Examination by transmitted light may be made possible by a pair of mirrors $e^3$, $e^4$ shown in dotted lines and arranged respectively above the lamp and the object at a suitable height. The instrument can be made self-contained by providing a resistance box K and switches for the lamp in the chamber at the lower end of the camera.

What I claim and desire to secure by Letters Patent of the United States is:—

1. In a microscope of the inverted type, an integral block member formed with an axial hole adapted to receive the microscope tube and with its upper surface faced accurately at right angles to the tube hole.

2. In a microscope of the inverted type, an integral block member formed with an axial hole and an upper surface faced accurately at right angles to the said hole, and a microscope tube having a close sliding fit in the axial hole.

3. In a microscope as in claim 1, a tripod stage for the support of an object to be examined and a circular groove cut in the upper face of the said integral member and adapted to receive the feet of the said tripod stage.

4. In a microscope as in claim 2, means for adjusting the microscope tube in the said axial hole, which means comprise a nut screwing upon a screw threaded portion of the said tube and resting on the surface of the block.

5. In a microscope of the inverted type, a casing, an integral block member carried by the said casing and formed with an axial hole, a microscope tube adjustable in the said axial hole, a vertical partition dividing the casing into a chamber for the microscope and a second chamber at one side, and illuminating means provided in the said side chamber and adapted to illuminate the work.

6. In a microscope of the inverted type, a casing, an integral block member carried by the said casing and formed with an axial hole, a microscope tube adjustable in the said axial hole, a vertical partition dividing the casing into a chamber for the microscope and a second chamber at one side, illuminating means provided in the said side chamber, a reflector mounted upon the illuminating means and a second reflector associated with the microscope tube and adapted to reflect the light upwardly upon the object.

7. In a microscope as in claim 5, a screen mounted at one side of the casing and angularly disposed relatively to the microscope tube axis and an angularly disposed reflector situated below the microscope tube and directing the light beam on to the said screen.

8. In a microscope as in claim 1, an eye-piece tube sliding in an aperture in the side of the said integral block member and an illuminating reflector fitted at the inner end of the said tube and adapted to deflect the light to the eye-piece of the tube when the latter is slidden into place.

9. A comparison device for microscopic investigation, comprising a supporting casing adapted to form part of a microscope of camera type and a carrier in the said casing adapted to receive a photo-micro comparison plate in a position suitable for observing in association with the microscopically enlarged image to be compared.

10. In a comparison device as in claim 9, illuminating means and means for controlling the illumination of the said comparison plate.

11. A microscope of camera type comprising an enclosing casing, a screen mounted at one side of the casing, means for illuminating the microscope object, a reflector placed below the microscope and adapted to reflect the light beam to the said screen, means for supporting a photo-micro comparison plate immediately at one side of the microscope screen, means for illuminating the said comparison plate and means for controlling the illumination of the said plate to adjust the illumination to that of the microscope image on the screen.

12. A microscope of camera type comprising an enclosing casing, a screen mounted at one side of the casing, means for illuminating the microscope object, a reflector placed below the microscope and adapted to reflect the light beam on to the said screen, means for supporting a photo-micro comparison plate immediately at one side of the microscope screen and a reflector provided for the said illuminating means, by which the source of illumination for the microscope is utilized for the comparison plate.

13. In a microscope as in claim 12, means for controlling the illumination of the said comparison plate interposed in the light path between the source of illumination and the said plate, whereby the illumination of the comparison plate and the microscopic image may be equalized.

14. In a microscope of the inverted type, a casing, a microscope tube carried at the upper end of the said casing, a vertical partition dividing the casing into a chamber for the microscope and a second chamber at one side, a lamp in the said side chamber, a condenser fitted above the lamp, a tilted mirror above the condenser adapted to reflect the light into the head of the microscope tube, a reflector in the said head reflecting the light upwardly to the object, a tilted reflector vertically below the microscope tube, a second reflector in the side chamber below the lamp, a screen receiving the microscope image, fitted in a sloping position at the side of the casing, and means for supporting a comparison plate in the side chamber immediately at the side of and parallel to the microscope screen, the light from below the lamp being reflected on to the said comparison plate.

15. In a microscope as in claim 14, a light filter interposed in the beam of light between the lamp and the comparison plate.

16. In a microscope as in claim 12, a detachable hood adapted to cover both the comparison plate and the microscope screen and to allow of simultaneous observation of both without interference from extraneous light.

ROBERT LOW SMITH.